United States Patent
Nagura

(10) Patent No.: US 8,576,330 B2
(45) Date of Patent: Nov. 5, 2013

(54) CAMERA MODULE AND ELECTRONIC DEVICE

(75) Inventor: Kazuhito Nagura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/345,981

(22) Filed: Jan. 9, 2012

(65) Prior Publication Data

US 2012/0182463 A1 Jul. 19, 2012

(30) Foreign Application Priority Data

Jan. 13, 2011 (JP) ................................. 2011-005122

(51) Int. Cl.
*H04N 5/225* (2006.01)
*H04N 7/18* (2006.01)

(52) U.S. Cl.
USPC ......... 348/360; 348/220.1; 348/143; 348/335

(58) Field of Classification Search
USPC ............... 348/143, 155, 161, 208.13, 208.16, 348/289–292, 335–344, 360, 220.1
See application file for complete search history.

(56) References Cited

U.S. PATENT DOCUMENTS

| | | | | |
|---|---|---|---|---|
| 4,827,348 A | * | 5/1989 | Ernest et al. | 348/221.1 |
| 5,515,119 A | * | 5/1996 | Murdock et al. | 352/131 |
| 6,052,230 A | * | 4/2000 | Clark | 359/626 |
| 6,597,869 B2 | | 7/2003 | Uchida et al. | |
| 7,477,314 B2 | * | 1/2009 | Nanjo et al. | 348/363 |
| 7,929,041 B2 | * | 4/2011 | Okabe | 348/340 |
| 2002/0012060 A1 | * | 1/2002 | High et al. | 348/342 |
| 2004/0145749 A1 | * | 7/2004 | Shigeki et al. | 356/494 |

FOREIGN PATENT DOCUMENTS

| | | |
|---|---|---|
| JP | 62-125228 U | 8/1987 |
| JP | 05-4679 U | 1/1993 |
| JP | 11-242257 A | 9/1999 |
| JP | 2000-081663 A | 3/2000 |
| JP | 2003-21858 A | 1/2003 |
| JP | 2003-298903 A | 10/2003 |
| JP | 2004-45652 A | 2/2004 |

* cited by examiner

*Primary Examiner* — Nhan T Tran
*Assistant Examiner* — Xi Wang
(74) *Attorney, Agent, or Firm* — Birch, Stewart, Kolasch & Birch, LLP

(57) ABSTRACT

A camera module 20 includes an image sensing device 3, and a lens 5 for converging, on the image sensing device 3, incident light 40 from a direction in which an image is shot. The camera module 20 further includes a filter 30 including (i) a visible light scattering filter 8 for scattering the incident light 40 and (ii) a visible light transmitting filter 9 for transmitting the incident light 40, the filter 30 being provided, on a side of the lens 5 from which side the incident light 40 enters, so as to be movable perpendicular to a direction 42 of the incident light 40.

5 Claims, 6 Drawing Sheets

CAMERA MODULE AND ELECTRONIC DEVICE

This Nonprovisional application claims priority under 35 U.S.C. §119(a) on Patent Application No. 2011-005122 filed in Japan on Jan. 13, 2011, the entire contents of which are hereby incorporated by reference.

TECHNICAL FIELD

The present invention relates to (i) a camera module capable of selectively shooting a high-definition image or a blurred image and (ii) an electronic device provided with the camera module.

BACKGROUND ART

Recently, various electronic devices (for example, a personal computer and a television) provided with a camera module have been frequently used. The camera module can be incorporated in an electronic device in advance, alternatively can be externally mounted on the electronic device. In both cases, the camera module provided in/mounted on the electronic device can shoot a high-definition image (static image and moving image).

The electronic device provided with the camera module not only shoots an image but also frequently sends the image to a specific recipient through the Internet or distributes the image to unspecific recipients through the Internet. Further, the following mechanism has been proposed. The electronic device (particularly, a television) simultaneously transmits not only the image but also sounds through the Internet, so as to be utilized as a so-called TV phone. It has been expected that such an electronic device is in further widespread use in the future.

Various electronic devices provided with a sensor for detecting a human body approaching have been frequently used. The sensor detects a human body approaching, and sends an electric signal to an internal device included in the electronic device. The internal device decodes the electronic signal, and then sends an operation instruction to the electronic device. The electronic device is operated according to the operation instruction. Utilization of such a sensor for detecting a human body approaching allows a user to operate the electronic device without carrying out any special operations.

The utilization of the sensor for detecting a human body approaching allows low power consumption of the electronic device (for example, in a case where the sensor does not detect a human body approaching to the electronic device, display lightness of the electronic device is decreased or the electronic device is turned off).

The above-described function of shooting a high-definition image and function of detecting a human body approaching are shooting and detecting functions to be provided to the electronic device. It is accordingly considered that an electronic device having the above two functions will be eagerly required in the feature.

In order to meet the requirement, a camera module capable of shooting a high-definition image and a sensor dedicated to detection of a human body are not individually provided, but the following arrangement is possibly required. The camera module capable of shooting a high-definition image also serves as the sensor for detecting a human body.

Meanwhile, it is concerned that, in a case where the camera module capable of shooting a high-definition image is used as the sensor for detecting a human body with a resolution of the camera module, a general user is anxious about (i) when the camera module shoots an image and (ii) whether or not the image leaks out through the Internet.

In order to cause the general user to accept the arrangement, it is inevitable that (i) a user is incompletely identified in cases other than a case where the user intentionally shoots an image and (ii) a resolution necessary for detection of a human body is obtained.

That is, the high-definition image needs to have a resolution (i) from which the user is incompletely identified and (ii) which is necessary for detection of a human body.

In order to decrease a resolution of an image, for example, the following techniques are generally employed. Pixels adjacent to a sensor are binned to form a macro pixel, so that the resolution of the image is decreased. Alternatively, an image is compressed or blurred by a signal processing section.

However, in a case where the camera module of the present invention is employed as above, virus infection of the electronic device will possibly cause failure in the function of shooting a high-definition image and the function of detecting a human body approaching. Therefore, these techniques are not suitable for decreasing the resolution of the image shot by the camera module of the present invention.

Patent Literature 1 discloses a technique for creating and outputting image data, specifically, a camera module connected to a network, including (i) creation means for creating image data having a high resolution and image data having a low resolution, (ii) a detector for detecting an importance of an object of shooting, and (iii) means for selecting, according to an output from the detector, any one of the image data having the high resolution and the image data having the low resolution so as to output selected image data to the network.

Patent Literature 1 discloses an example of utilization of the function of detecting a human body approaching, specifically, a technique of a television receiver which includes a sensor for detecting a human body approaching and which is turned on/off in a case where the sensor detects the human body approaching.

A general technique includes a technique in which a camera module provided in an electronic device displays, by use of, for example, an LED, that a user is shooting an image.

CITATION LIST

Patent Literature

Patent Literature 1
Japanese Utility Model Application Publication, Jitsukaihei No. 5-4679 A (1993) (Publication Date: Jan. 22, 1993)
Patent Literature 2
Japanese Patent Application Publication, Tokukai No. 2003-298903 A (Publication Date: Oct. 17, 2003)

SUMMARY OF INVENTION

Technical Problem

However, the conventional techniques have the following problems.

The conventional technique just shows that a user is shooting an image, but has no means for automatically decreasing a resolution of an image to be shot. It is, therefore, impossible to carry out both a high-definition image shooting function and a human body detecting sensor function.

Patent Literature 1 does not disclose a concrete configuration of the detecting sensor. Therefore, the detecting sensor disclosed in Patent Literature 1 is just a human body detecting sensor, and it cannot be said that the detecting sensor is configured to shoot a high-definition image.

A technique of Patent Literature 2 requires a circuit in which a complicated process is carried out, such as a circuit in which an image of an object of shooting is analyzed to detect an importance of the object of shooting.

The present invention was made in view of the problems, and an object of the present invention is to provide a camera module capable of selectively obtaining, by use of a single image sensing device, (i) a high-definition image of an object of shooting or (ii) an image of the object of shooting, in which the object of shooting is incompletely identified and which has a resolution necessary for detection of a human body, without the circuit in which the complicated process is carried out, such as the circuit in which the image of the object of shooting is analyzed to detect the importance of the object of shooting.

Solution to Problem

In order to attain the object, a camera module of the present invention, including: an image sensing device; a lens for converging, on the image sensing device, incident light from a direction in which an image is shot; and a filter including (i) a visible light scattering section for scattering the incident light and (ii) a visible light transmitting section for transmitting the incident light, the filter being provided, on a side of the lens from which side the incident light enters, so as to be movable perpendicular to a direction of the incident light.

According to the configuration, the filter is provided in front of the lens, and can move in a direction perpendicular to the incident light. The filter includes (i) the visible light scattering section for scattering the incident light and (ii) the visible light transmitting section for transmitting the incident light. Therefore, movement of the filter in front of the lens allows either the visible light scattering section or the visible light transmitting section to cover the lens.

In a case where the filter is moved to a location where the visible light scattering section covers the lens, scattered light enters the lens. This allows incomplete identification of an object of shooting, and this also makes it possible to obtain an image having a resolution necessary for detection of a human body. In a case where the filter is moved to a location where the visible light transmitting section covers the lens, light enters the lens without substantial deterioration. This makes it possible to shoot a high-definition image which allows the identification of the object of shooting.

On this account, the camera module of the present invention can obtain an image having a resolution optimal for a use. For example, in a case where a user intentionally shoots an image, the visible light transmitting section is moved to cover the lens, so that a high-definition image can be shot. Meanwhile, in a case where a user uses the camera module for a purpose other than a user's intentional shooting, that is, the camera module is used as a sensor for detecting a human body approaching, the visible light scattering section is moved to cover the lens, so that it is possible to obtain an image of an object of shooting, in which the object of shooting is incompletely identified and which has a resolution necessary for detection of a human body.

As described above, according to the present invention, either the visible light transmitting section or the visible light scattering section is selectively used. This makes it possible to selectively obtain, by use of a single image sensing device, either (i) a high-definition image of that object of shooting or (ii) an image of that object of shooting, in which that object of shooting is incompletely identified and which has a resolution necessary for detection of a human body. It is accordingly possible to selectively shoot a high-definition image or a blurred image by a simple arrangement in which one of two types of filters is selectively used, without a circuit in which a complicated process such as analysis of an image is carried out.

In order to attain the object, another camera module of the present invention, further including: means for automatically moving, in response to a control signal, the filter to a first location where the visible light scattering section covers the lens from a second location where the visible light transmitting section covers the lens, means for automatically moving, in response to a control signal, the filter from the first location to the second location being not provided.

According to the configuration, the filter can automatically move from the second location where the visible light transmitting section covers the lens to the first location where the visible light scattering section covers the lens. However, the filter cannot automatically move from the first location where the visible light scattering section covers the lens to the second location where the visible light transmitting section covers the lens. Therefore, the visible light transmitting section does not cover the lens when a user does not intend to move the visible light transmitting section to cover the lens. It is consequently possible to prevent a high-definition image from being shot in a case where the user does not intend that.

In order to attain the object, an electronic device of the present invention, including the above-described camera module.

According to the configuration, it is possible to provide an electronic device capable of selectively shooting a high-definition image or a blurred image by a simple arrangement in which one of two types of filters is selectively used, without a circuit in which a complicated process such as analysis of an image is carried out.

For a fuller understanding of the nature and advantages of the invention, reference should be made to the ensuing detailed description taken in conjunction with the accompanying drawings.

Advantageous Effects of Invention

A camera module of the present invention can selectively obtain, by use of a single image sensing device, (i) a high-definition image of an object of shooting or (ii) an image of the object of shooting, in which the object of shooting is incompletely identified and which has a resolution necessary for detection of a human body, without a circuit in which a complicated process is carried out, such as a circuit in which the image of the object of shooting is analyzed to detect importance of the object of shooting.

DESCRIPTION OF EMBODIMENTS

Figure 1:
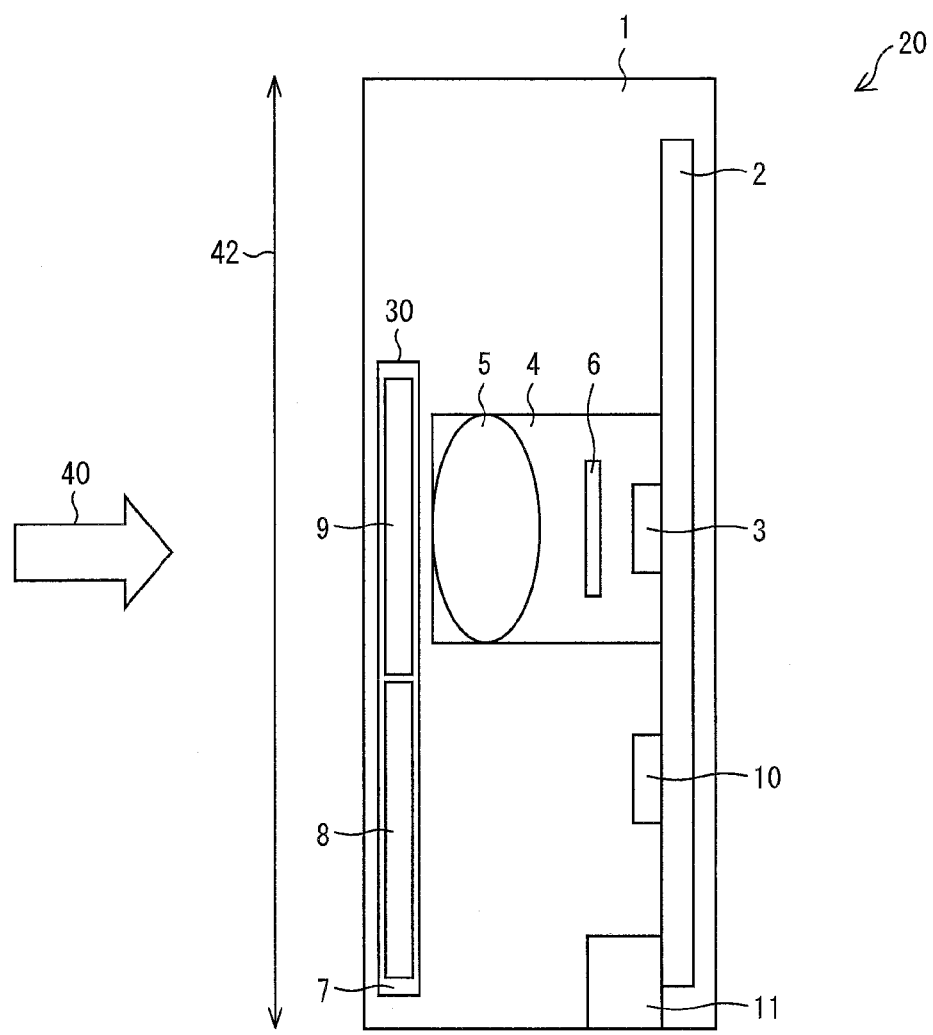
FIG. 1 is a cross-sectional view illustrating a camera module in accordance with Embodiment 1 of the present invention.

The following description will discuss by exemplifying a camera module, to be externally mounted, in accordance with an embodiment of the present invention. Note that the present invention is not limited to the following embodiments. Identical reference numerals are given to members having respective identical functions and operations, and descriptions of such members are omitted here.

Embodiment 1

The following description will discuss Embodiment 1 of the present invention, with reference to FIGS. 1 through 5.

(Configuration of Camera Module 20)

FIG. 1 is a cross-sectional view illustrating a camera module 20 in accordance with an embodiment of the present invention. As shown in FIG. 1, the camera module 20 includes a housing 1, a printed board 2, a lens 5 and a filter 30. The camera module 20 is a module for shooting an image (a static image and a moving image) of an object of shooting, and the camera module 20 is incorporated in an electronic device (later described).

Mounted on the printed board 2 are an image sensing device 3, a video processing circuit 10, and a connector 11. The lens 5 and an infrared radiation shielding filter 6 are incorporated in a lens holder 4. The lens holder 4 is fixed to the printed board 2 in a state where (i) an optical axis of light that enters the lens 5 from a direction in which an object of shooting is shot and (ii) the image sensing device 3 have been adjusted. In the lens holder 4, the lens 5 is provided in the direction in which the object of shooting is shot. The infrared radiation shielding filter 6 is provided between the lens 5 and the image sensing device 3.

(Image Sensing Device 3)

The light, that enters the camera module 20 from the direction in which the object of shooting is shot, ultimately reaches the image sensing device 3 after passing through the filter 30, the lens 5, and the infrared radiation shielding filter 6 in this order. That is, the lens 5 causes the light, which has entered the lens 5, to be converged onto the image sensing device 3. The image sensing device 3 converts received light into an image (a video). Thereafter, the image sensing device 3 transmits a converted image to the video processing circuit 10. The video processing circuit 10 carries out a signal process with respect to a supplied image so that the supplied image is transmitted, in a predetermined format, to the electronic device connected to the camera module 20. Thereafter, the video processing circuit 10 supplies the image, which has been subjected to the signal process, to the electronic device through the connector 11.

(Filter 30)

As shown in FIG. 1, the filter 30 includes a visible light scattering filter 8 (visible light scattering section), a visible light transmitting filter 9 (visible light transmitting section), and a filter holder 7. The visible light scattering filter 8 brings about an effect of scattering visible light that is transmitted through the visible light scattering filter 8. The visible light scattering filter 8 contains a filler or has a crimped surface.

The visible light transmitting filter 9 brings about an effect of transmitting visible light without substantial deterioration in the visible light. The visible light scattering filter 8 and the visible light transmitting filter 9 are fixed to the filter holder 7, and incorporated in the filter 30.

(Movement of Filter 30)

Incident light 40 shown in FIG. 1 is light that enters the camera module 20 from the direction in which an object of shooting is shot. The filter 30 is provided on a light incident side of the housing 1 (lens 5). Note that the filter 30 is provided so as to be movable in a direction 42 perpendicular to the incident light 40. The filter 30 can be moved to a location where the visible light transmitting filter 9 covers the lens 5 or to a location where the visible light scattering filter 8 covers the lens 5.

Figure 4:
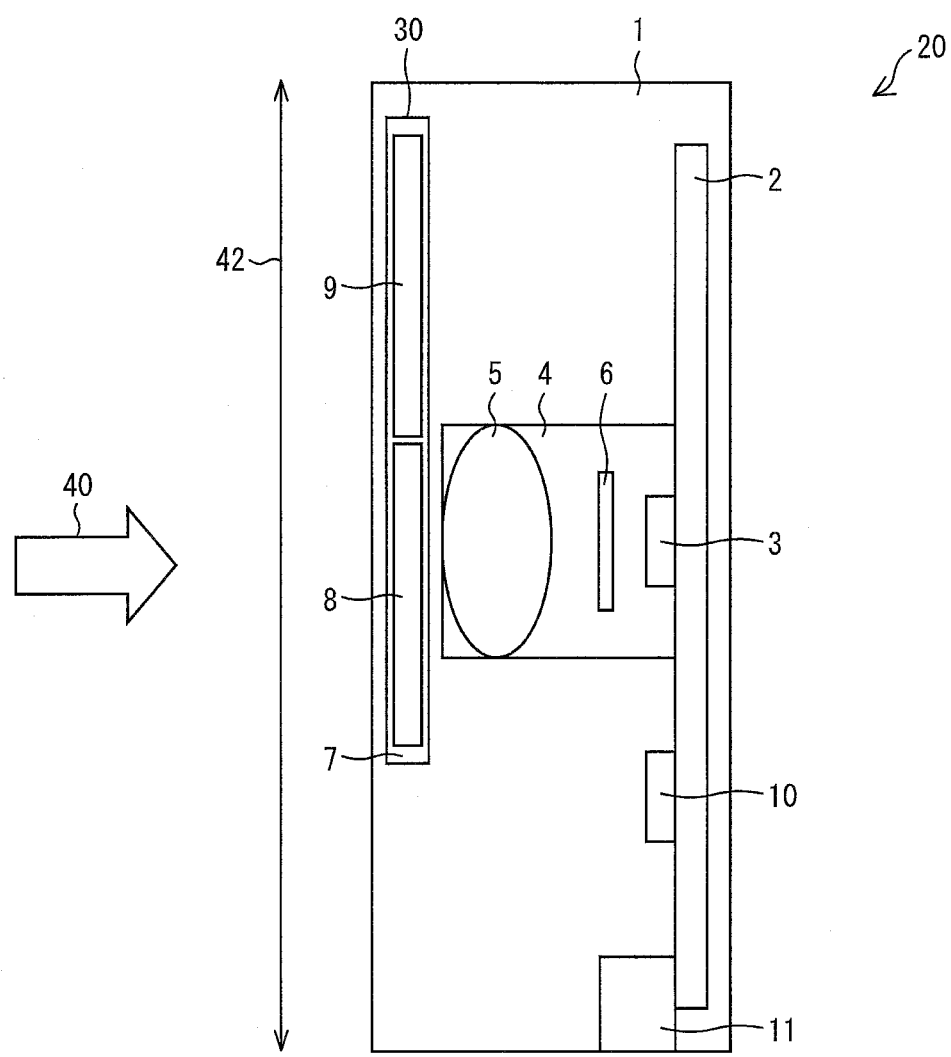
FIG. 4 is a cross-sectional view showing an example of how a filter in accordance with Embodiment 1 of the present invention moves.

FIG. 1 shows that the filter 30 is moved and fixed to the housing 1 in the location where the visible light transmitting filter 9 completely covers the lens 5. FIG. 4 shows that the filter 30 is moved and fixed to the housing 1 in the location where the visible light scattering filter 8 completely covers the lens 5. The camera module 20 further includes means for fixing the filter 30. The means fixes the filter 30 to (i) the location where the visible light transmitting filter 9 completely covers the lens 5 or (ii) the location where the visible light scattering filter 8 completely covers the lens 5.

(Fixing of Filter 30)

Figure 2:
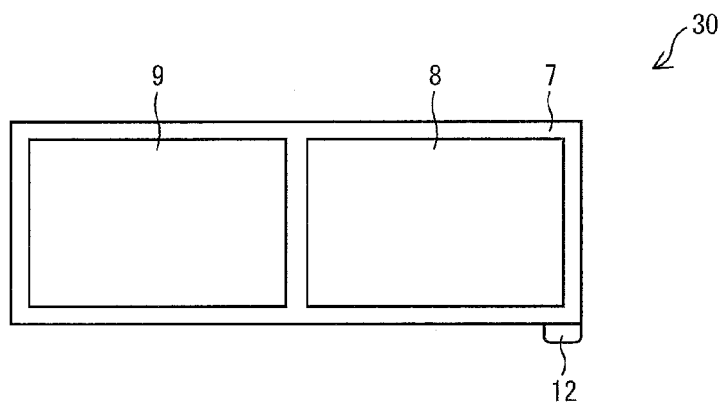
FIG. 2 is an elevation view illustrating a filter in accordance with Embodiment 1 of the present invention.
Figure 3:
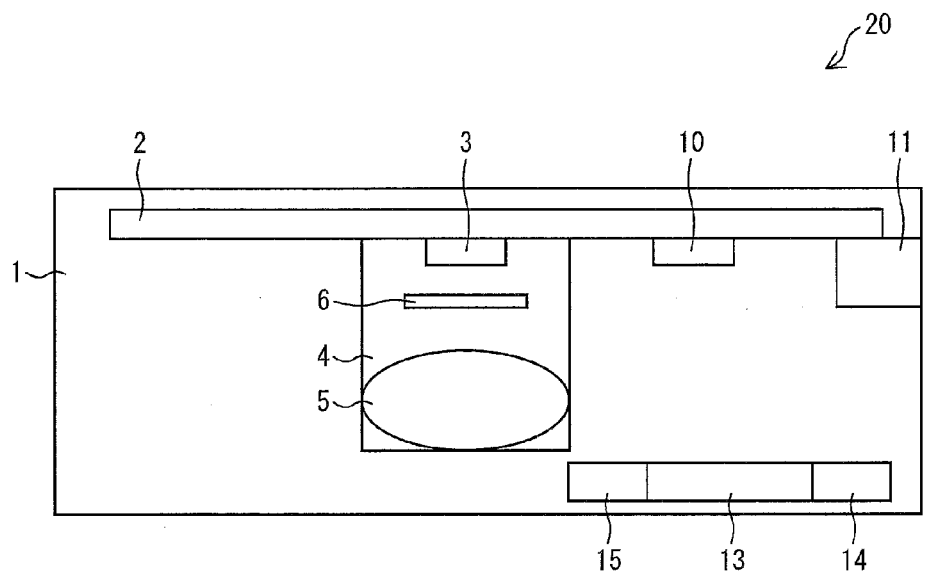
FIG. 3 is a cross-sectional view that explains a fixation mechanism of a filter in accordance with Embodiment 1 of the present invention.

The following description will discuss the means for fixing the filter 30 in the housing 1, with reference to FIGS. 2 and 3. FIG. 2 is an elevation view illustrating the filter 30. FIG. 3 is a cross-sectional view illustrating the camera module 20. As shown in FIG. 2, a projection 12 is provided on a lower part of the filter holder 7. As shown in FIG. 3, a groove 13 is provided in the housing 1, and concaves 14 and 15 are provided at both edges of the groove 13. The projection 12 fits in the concave 14 or the concave 15. This causes the filter 30 to be fixed to the housing 1. Specifically, the visible light scattering filter 8 completely covers the lens 5 in a case where the projection 12 fits in the concave 15, whereas the visible light transmitting filter 9 completely covers the lens 5 in a case where the projection 12 fits in the concave 14.

(Effect of Filter 30)

In a case where, as shown in FIG. 1, the filter 30 is fixed to the housing 1 in the location where the visible light transmitting filter 9 completely covers the lens 5, visible light, that has entered from the direction in which an object of shooting is shot, reaches the image sensing device 3 without substantial deterioration. It is therefore possible to obtain a high-definition image when an object of shooting is shot. Meanwhile, in a case where, as shown in FIG. 4, the filter 30 is fixed to the housing 1 in the location where the visible light scattering filter 8 completely covers the lens 5, the visible light, that has entered from the direction in which the object of shooting is shot, scatters and reaches the image sensing device 3. It is therefore possible to obtain a blurred image when the object of shooting is shot.

As described above, the camera module 20 selectively uses one of the two types of filters (the visible light transmitting filter 9 and the visible light scattering filter 8). Such a configuration makes it possible to selectively obtain, by use of a single image sensing device 3, either (i) a high-definition image of that object of shooting or (ii) an image of that object of shooting, in which that object of shooting is incompletely identified and which has a resolution necessary for detection of a human body. For example, in a case where a user intentionally shoots an image, the visible light transmitting filter 9 is moved to completely cover the lens 5, so that a high-definition image can be shot. Meanwhile, in a case where the user uses the camera module 20 for a purpose other than a user's intentional shooting, that is, the camera module 20 is used as a sensor for detecting a human body approaching, the visible light scattering filter 8 is moved to completely cover the lens 5, so that it is possible to obtain an image of an object of shooting, in which the object of shooting is incompletely identified and which has a resolution necessary for detection of a human body.

Since one of the two types of filters are selectively used, it is unnecessary for the video processing circuit 10 to change, depending on the filters, a process to be carried out. Therefore, the video processing circuit 10 can be simply configured. That is, the camera module 20 can selectively obtain, by use of the single image sensing device 3, either (i) the high-definition image of that object of shooting or (ii) the image of that object of shooting, in which that object of shooting is incompletely identified and which has the resolution necessary for detection of the human body. It is therefore possible to selectively shoot a high-definition image or a blurred image with such a simple configuration in which one of the two types of filters is selectively used, without a circuit in which a complicated process such as analysis of an image is carried out.

(Configuration of System)

Figure 5:
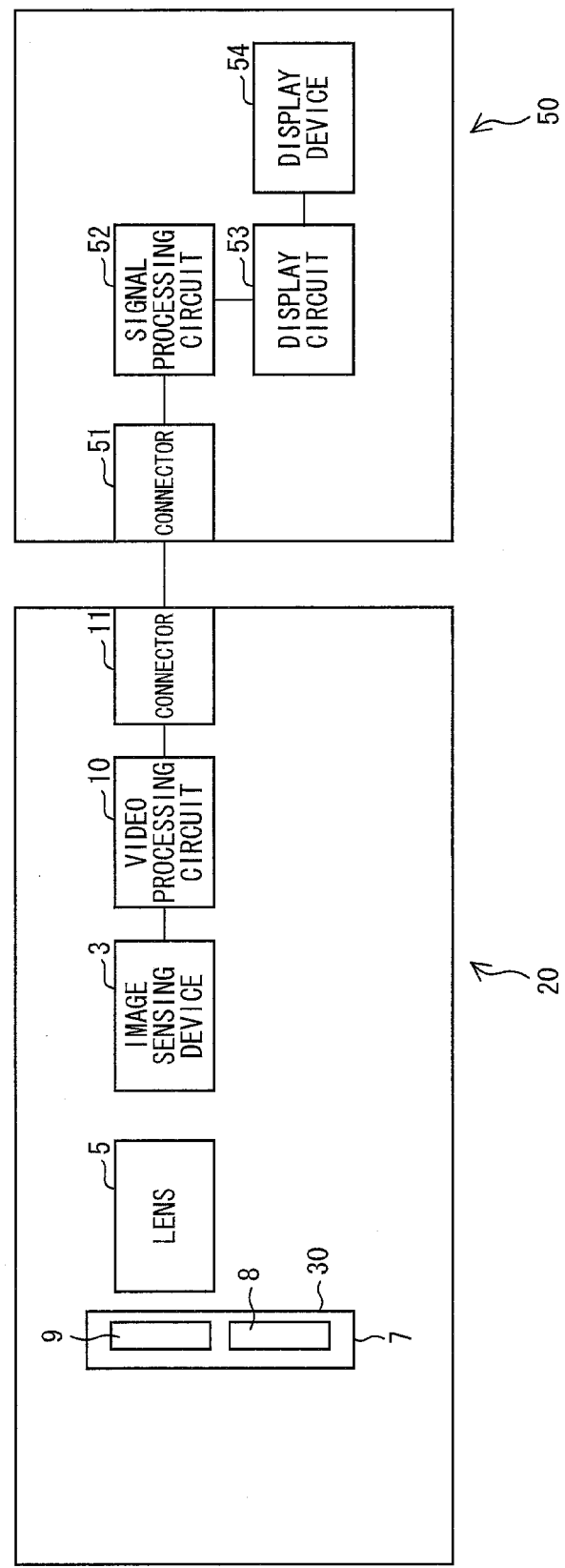
FIG. 5 is a system configuration view in accordance with Embodiment 1 of the present invention.

FIG. 5 is a system configuration view used to describe a camera module in accordance with Embodiment 1 of the present invention. Note that, as to a configuration of an electronic device of the present invention, the following description will merely discuss the configuration of the camera module of the present invention. As shown in FIG. 5, the camera module 20 is externally connected to an electronic device 50. The electronic device 50 includes a connector 51, a signal processing circuit 52, a display circuit 53, and a display device 54.

The signal processing circuit 52 is electrically connected to the video processing circuit 10, via the connectors 51 and 11. A video, subjected to a signal process by the video processing circuit 10, is supplied to the signal processing circuit 52. This allows the electronic device 50 to obtain the video shot by the camera module 20.

The electronic device 50 has a function of transmitting the image of the object of shooting, which has been shot by the camera module 20, outside via a communication network such as the Internet. Note that, as early described, the camera module 20 can try not to shoot a high-definition image of a user, in a case where the user does not intentionally shoot a high-definition image. As such, it is possible to free the user from anxiety for outside flow of an image in which the user himself can be identified.

Note that the electronic device, electrically connected to the camera module, does not necessarily have the function of transmitting an image outside via the Internet. Alternatively, examples of the electronic device of the present embodiment encompass, for example, an electronic device capable of outputting an image outside the electronic device, via an external output terminal or by use of an external memory.

Examples of the electronic device 50 encompass a personal computer and a television. However, the examples of the electronic device 50 are not limited to these examples.

Embodiment 2

Figure 6:
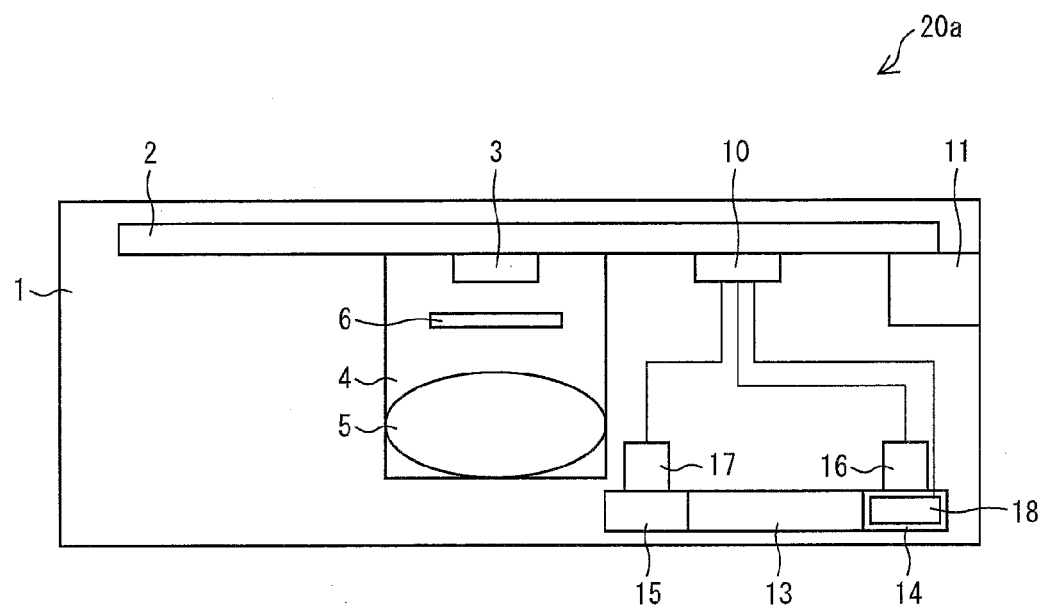
FIG. 6 is a cross-sectional view of a camera module in accordance with Embodiment 2 of the present invention.
Figure 7:
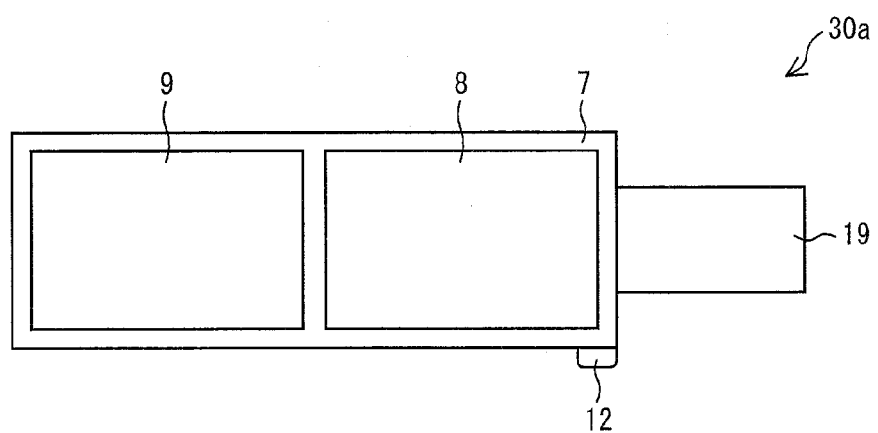
FIG. 7 is an elevation view illustrating a filter in accordance with Embodiment 2 of the present invention.
Figure 8:
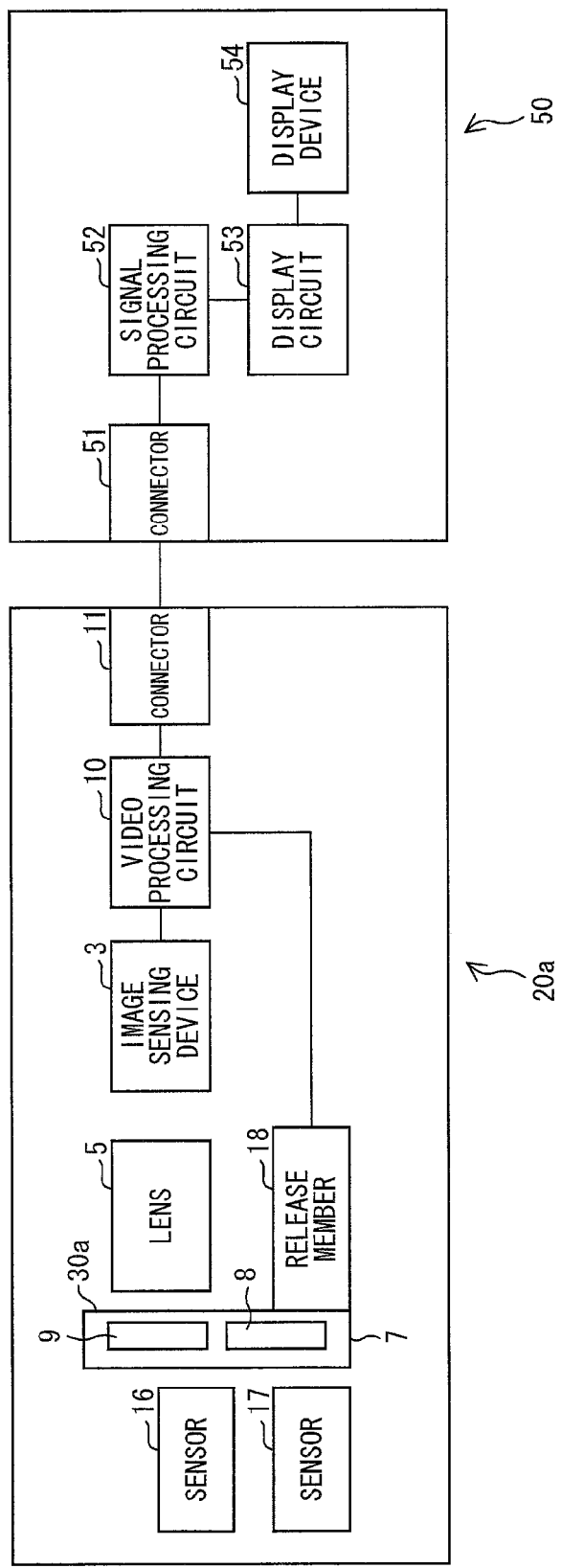
FIG. 8 is a view that explains a configuration of a system in accordance with Embodiment 2 of the present invention.

The following description will discuss another embodiment of the present invention, with reference to FIGS. 6 through 8. For convenience, members, having functions identical to those in the drawings of Embodiment 1 are given identical reference numerals, and descriptions of such members are omitted here.

(Configuration of Camera Module 20*a*)

FIG. 6 is a cross-sectional view illustrating a camera module 20*a* of the present invention. The following description mainly discuss a difference in mechanism and function between Embodiments 1 and 2. As shown in FIG. 6, the camera module 20*a* includes, in addition to a housing 1, a printed board 2, a lens 5 and a filter 30, a sensor (detector) 16, a sensor 17 (detector), and a release member 18. The sensor 16 is provided in the vicinity of the concave 14, and the sensor 17 is provided in the vicinity of the concave 15. The sensor 16 supplies, to the video processing circuit 10, a signal indicating that the projection 12 fits in the concave 14. The sensor 17 supplies, to the video processing circuit 10, a signal indicating that the projection 12 fits in the concave 15. The release member 18 is provided in the concave 14. The release member 18 is a member for releasing the projection 12 from fitting in the concave 14. The release member 18 can release the projection 12 from fitting in the concave 14 in response to a release signal (control signal) supplied from the video processing circuit 10.

(Filter 30*a*)

FIG. 7 is an elevation view illustrating a filter in accordance with Embodiment 2 of the present invention. As shown in FIG. 7, the filter 30*a* includes a pressing member 19 in addition to a visible light scattering filter 8, a visible light transmitting filter 9 and a filter holder 7. The pressing member 19 is a member for pressing an internal wall of the housing 1 so as to move the filter 30*a*. The pressing member 19 is provided on a side surface of the filter 30*a*. Since the pressing member 19 is provided on the side surface of the filter 30*a*, on which side surface side of the filter 30*a* the visible light scattering filter 8 is incorporated, the pressing member 19 can press the internal wall of the housing 1. The pressing member 19 strongly presses the internal wall of the housing 1 while the projection 12 is fitting in the concave 14. The pressing member 19 is set such that the pressing member 19 keeps pressing the internal wall of the housing 1 until the projection 12 fits in the concave 15 after the release member 18 releases the projection 12 from fitting in the concave 14 in response to the release signal from the video processing circuit 10.

(Configuration of System)

FIG. 8 is a system configuration view used to describe a camera module in accordance with Embodiment 2 of the present invention. Note that, as to a configuration of an electronic device of the present invention, the following description will merely discuss the configuration of the camera module of the present invention. As shown in FIG. 8, the camera module 20*a* is externally connected to the electronic device 50. The signal processing circuit 52 of the present embodiment transmits, to the camera module 20*a*, various signals according to which the camera module 20*a* is controlled. Specifically, the various signals are transmitted to the video processing circuit 10, via the connectors 51 and 11. The video processing circuit 10 is configured to output a received signal to the release member 18.

(Electronic Device 50)

The electronic device 50 can boot up an application in response to a user's instruction. In the present embodiment, execution of the application makes it possible to (i) shoot a high-definition image in which a user can be identified and (ii) transmit the image to a specified or unspecified target recipient via the Internet.

A user instructs the electronic device 50 to boot up the application. This causes the signal processing circuit 52 to boot up a designated application. The signal processing circuit 52 instructs the display circuit 53 to display a comment on a movement of the filter. The display circuit 53 controls the display device 54 to display a comment "the filter 30*a* is moved to a location where a high-definition image can be shot".

A user manually moves the filter 30*a* to the location where the visible light transmitting filter 9 covers the lens 5. The user simultaneously manually fits the projection 12 of the filter 30*a* in the concave 14. In a case where the sensor 16 detects the projection 12 fitting in the concave 14, the sensor 16 supplies, to the video processing circuit 10, a signal indicating that the projection 12 fits in the concave 14. The video processing circuit 10 transmits the signal to the signal processing circuit 52. The display circuit 53 controls the display device 54 to keep displaying the comment until the signal processing circuit 52 receives the signal. After receiving the signal, the signal processing circuit 52 starts shooting, and keeps the operation of the application.

(Human Body Detecting Mode)

After the execution of the application terminates, the camera module 20*a* automatically operates in a human body detecting mode. This procedure will be described below. Firstly, a user instructs the electric device 50 to terminate the application. The signal processing circuit 52 terminates the application in response to the user's instruction. When the application is terminated, the signal processing circuit 52 transmits, to the video processing circuit 10, a release signal (control) in response to which the projection 12 is released from the concave 14. The video processing circuit 10 supplies the release signal to the release member 18. The release member 18 releases the projection 12 from fitting in the concave 14 in response to the release signal. The pressing member 19 presses the internal wall of the housing 1, so that the filter 30*a* is moved. That is, the filter 30*a* is automatically moved to the location where the visible light scattering filter 8 covers the lens 5, and then the projection 12 fits in the concave 15.

In a case where the sensor 17 detects the projection 12 fitting in the concave 15, the sensor 17 supplies, to the video processing circuit 10, a signal indicating that the projection 12 fits in the concave 15. The video processing circuit 10 transmits the signal to the signal processing circuit 52. The signal processing circuit 52 operates in the human body detecting mode, after receiving the signal from the video processing circuit 10. This causes the camera module 20*a* to obtain an image of an object of shooting, (i) in which the object of shooting is incompletely identified and (ii) which has a resolution necessary for detection of a human body.

In a case where the signal processing circuit 52 cannot receive the signal from the video processing circuit 10, the signal processing circuit 52 gives an instruction to the display circuit 53 so that the display circuit 53 controls the display device 54 to display a comment on a movement of the filter. The display circuit 53 controls the display device 54 to display a comment "a location of the filter 30*a* is being confirmed", in response to the instruction. The display circuit 53 controls the display device 54 to keep displaying the comment until the signal processing circuit 52 receives the signal.

Note that, in the case where the signal processing circuit 52 cannot receive the signal from the video processing circuit 10, the signal processing circuit 52 does not operate in the human body detecting mode. That is, the image sensing device 3 does not shoot an object of shooting until the sensor 17 detects the projection 12 fitting in the concave 15. It is therefore possible to prevent a high-definition image from being accidentally shot in a case where a user does not intend to shoot any high-definition image.

(Manual Movement of Filter 30*a*)

In a case where a user does not intentionally shoot a high-definition image, that is, in a case where the camera module operates as a sensor, the projection 12 is in a state in which it fits in the concave 15. The concave 15 has no release member therein, unlike the concave 14. Further, while the projection 12 is fitting in the concave 15, the video processing circuit 10 and the signal processing circuit 52 do not communicate with each other. That is, the camera module 20*a* does not have means for releasing the projection 12 from fitting in the concave 15 and then automatically moving the filter 30*a* to a location where the projection 12 fits in the concave 14. Therefore, in order to release the projection 12 from fitting in the concave 15 and then fit the projection 12 in the concave 14, a user has to manually move the filter 30*a*. In other words, the visible light transmitting filter 9 will never cover the lens 5 when a user does not intend to move the visible light transmitting filter 9 to cover the lens 5. It is consequently possible to prevent a high-definition image from being shot in a case where the user does not intend that.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

(Electronic Device that Incorporates Camera Module)

The camera module 20 is not limited to a configuration in which it is externally connected to the electronic device. The camera module 20 can be incorporated in an electronic device, instead of externally connected. The camera module 20 incorporated in the electronic device has a mechanism identical to that of the camera module 20 externally connected to the electronic device. In a case where a user intentionally shoots an object of shooting, the filter 30 is fixed, to the housing 1, in the location where the visible light transmitting filter 9 covers the lens 5. This makes it possible to obtain a high-definition image. In a case where the camera module 20 is used as a sensor other than the case where a user intentionally shoots an object of shooting, the filter 30 is fixed, to the housing 1, in the location where the visible light scattering filter 8 covers the lens 5. This makes it possible to obtain an image of an object of shooting, (i) in which the object of shooting is incompletely identified and (ii) which has a resolution necessary for detection of a human body.

(Opening)

The filter 30 does not necessarily include the visible light transmitting filter 9. The filter 30 can have an opening instead of the visible light transmitting filter 9. In this configuration, visible light is transmitted through the opening as it is. Therefore, the filter 30, in which the opening is formed, can fulfill its function identical to that of the filter 30 including the visible light transmitting filter 9.

(Modified Example of the Present Invention)

It is preferable to configure the camera module of the present invention such that the visible light scattering section contain a filler for scattering light.

According to the configuration, visible light scatters and reaches the image sensing device. This makes it possible to obtain an image of an object of shooting, (i) in which the object of shooting is incompletely identified and (ii) which has a resolution necessary for detection of a human body.

It is preferable to configure the camera module of the present invention such that the visible light scattering section have a crimped surface for scattering light.

According to the configuration, visible light scatters and reaches the image sensing device. This makes it possible to obtain an image of an object of shooting (i) in which the object of shooting is incompletely identified and (ii) which has a resolution necessary for detection of a human body.

The camera module of the present invention can be further configured such that the visible light transmitting section is an opening formed in the filter.

According to the configuration, visible light reaches the image sensing device without substantial deterioration. This makes it possible to obtain a high-definition image.

The camera module of the present invention, further including a detector for detecting the filter being moved to a first location where the visible light scattering section covers the lens, the image sensing device not shooting an image until the detector detects the filter being moved to the first location where the visible light scattering section covers the lens, in a case where the filter is moved from a second location where the visible light transmitting section covers the lens to the first location where the visible light scattering section covers the lens.

According to the configuration, in a case where the detector detects the filter being moved to the first location where the visible light scattering section covers the lens, it is possible to obtain an image of an object of shooting, (i) in which the object of shooting is incompletely identified and (ii) which has a resolution necessary for detection of a human body. In a case where the detector cannot detect the filter being moved to the first location where the visible light scattering section covers the lens, the image sensing device does not shoot the image of the object of shooting. It is therefore possible to prevent a high-definition image from being accidentally shot in a case where a user does not intentionally shoot the high-definition image.

For a fuller understanding of the nature and advantages of the invention, reference should be made to the ensuing detailed description taken in conjunction with the accompanying drawings.

INDUSTRIAL APPLICABILITY

A camera module of the present invention can be extensively employed (i) as a camera for shooting a high-definition image and (ii) as a sensor for detecting a human body. Further, an electronic device including the camera module can be extensively employed as various electronic devices such as a personal computer or a television.

REFERENCE SIGNS LIST

1: housing
2: printed board
3: image sensing device
4: lens holder
5: lens
8: visible light scattering filter (visible light scattering section)
9: visible light transmitting filter (visible light transmitting section)
10: video processing circuit
12: projection
13: groove
14: concave
15: concave
16: sensor
17: sensor
18: release member
19: pressing member
20: camera module
20a: camera module
30: filter
30a: filter
50: electronic device

The invention claimed is:

1. An electronic device, comprising:
   a camera module; and
   a signal processing circuit,
   the camera module including:
   an image sensing device;
   responsive to the signal processing circuit terminating an application for shooting a high-definition image and after the application for shooting a high-definition image has ended, the signal processing circuit transmitting a control signal to the camera module;
   a lens for converging, on the image sensing device, incident light from a direction in which an image is shot;
   a filter including (i) a visible light scattering section for scattering the incident light and (ii) a visible light transmitting section for transmitting the incident light, the filter being provided, on a side of the lens from which side the incident light enters, so as to be movable perpendicular to a direction of the incident light; and
   a filter moving device operatively connected to the filter, the filter moving device automatically moving, in response to the control signal, the filter to a first location where the visible light scattering section covers the lens from a second location where the visible light transmitting section covers the lens,
   wherein the filter moving device requires manual operation to move the filter from the first location to the second location.

2. The electronic device as set forth in claim 1, wherein:
   the visible light scattering section contains a filler for scattering light.

3. The electronic device as set forth in claim 1, wherein:
   the visible light scattering section has a crimped surface for scattering light.

4. The electronic device as set forth in claim 1, wherein:
   the visible light transmitting section is an opening formed in the filter.

5. The electronic device as set forth in claim 1, further comprising:
   a detector for detecting the filter being moved to a first location where the visible light scattering section covers the lens,
   the image sensing device not shooting an image until the detector detects the filter being moved to the first location where the visible light scattering section covers the lens, in a case where the filter is moved from a second location where the visible light transmitting section covers the lens to the first location where the visible light scattering section covers the lens.

* * * * *